United States Patent [19]

Dobberpuhl

[11] 4,270,032
[45] May 26, 1981

[54] COMBINED SAFETY LEVER AND IGNITION INTERLOCK SWITCH

[75] Inventor: Dale R. Dobberpuhl, Horicon, Wis.

[73] Assignee: Deere & Company, Moline, Ill.

[21] Appl. No.: 25,817

[22] Filed: Apr. 2, 1979

[51] Int. Cl.³ .............................................. H01H 9/06
[52] U.S. Cl. .............................. 200/61.85; 200/61.87; 200/157
[58] Field of Search .................... 200/6 R, 6 C, 61.44, 200/61.58 R, 61.85, 61.86, 61.87, 61.89, 157; 123/198 D, 198 DB, 198 DC

[56] References Cited

U.S. PATENT DOCUMENTS

| | | | |
|---|---|---|---|
| 3,498,282 | 3/1970 | Dattilo | 123/198 D |
| 3,694,596 | 9/1972 | Carlson | 200/61.87 |
| 3,878,348 | 4/1975 | German | 200/157 |
| 3,980,068 | 9/1976 | Karsten et al. | 200/157 X |
| 4,062,135 | 12/1977 | Dobberpuhl | 200/61.58 R X |
| 4,186,291 | 1/1980 | Swanson | 200/61.87 X |

Primary Examiner—James R. Scott

[57] ABSTRACT

A self-propelled, walk-behind snowblower includes a pair of deadman control levers respectively pivotally mounted on a pair of handle bars of a guide handle structure. The levers are each spring biased to a normally released position and manually movable to an active position. A switch element is mounted for movement with each lever and completes an ignition circuit by engaging the associated handle bar when the lever is moved to its active position. The ignition circuit is also completed when a further interlock switch is closed by placing a collector-impeller control lever in a drive-disengage position.

7 Claims, 3 Drawing Figures

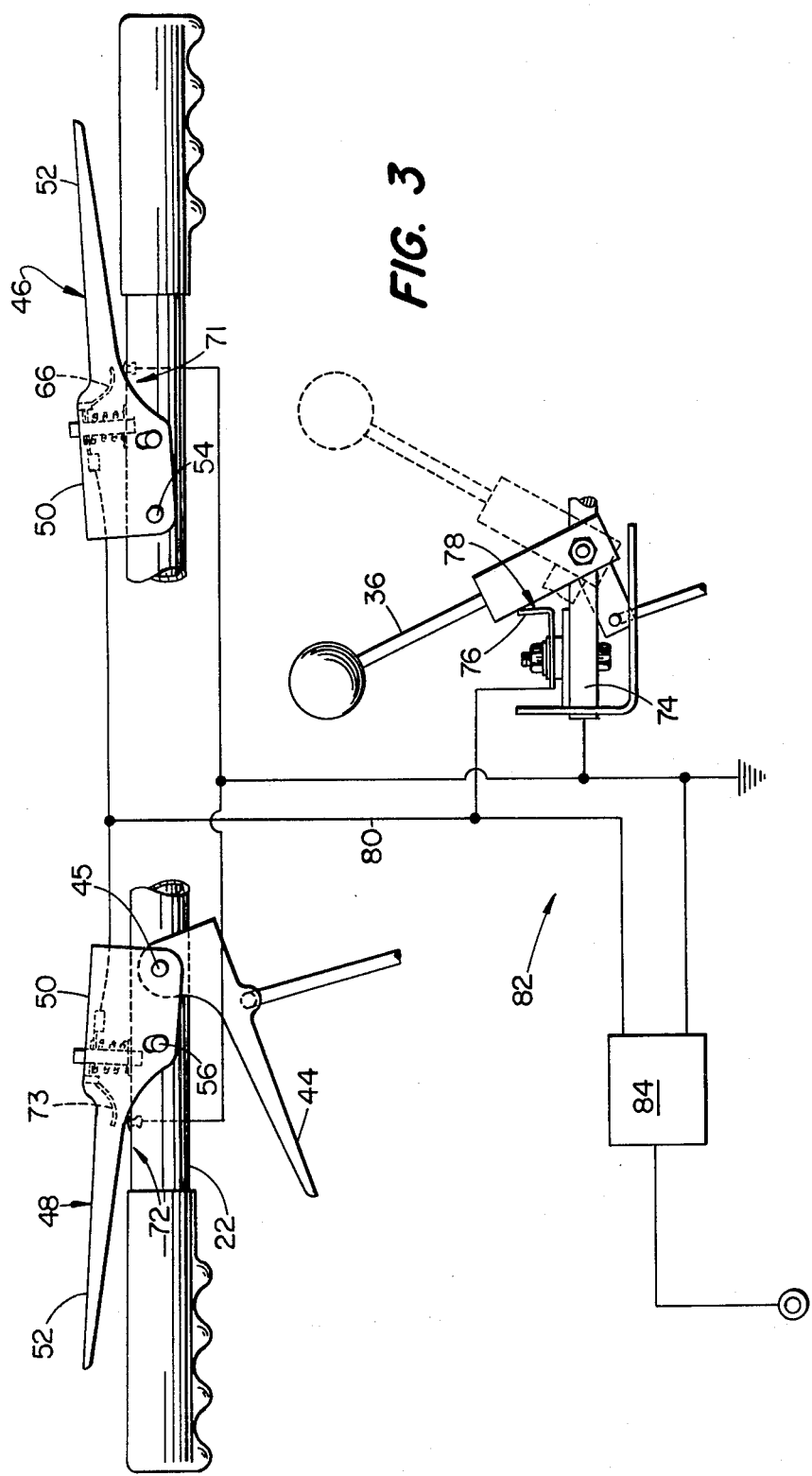

COMBINED SAFETY LEVER AND IGNITION INTERLOCK SWITCH

BACKGROUND OF THE INVENTION

The present invention relates to deadman control systems for self-propelled, walk-behind implements and more specifically relates to combined control lever and ignition interlock switch designs.

The present invention is concerned with safety interlock control systems designed for limiting the possibility that an operator of a self-propelled, walk-behind implement will come into contact with the tool of the implement when the tool drive is engaged while the engine is running. U.S. Pat. No. 4,062,135 issued to the applicant of the instant case on Dec. 13, 1977 is an example of such a control system. The implement disclosed in this patent is a snowblower including a collector-impeller as a driven tool. Separate control levers are provided on the guide handle structure for controlling the traction and collector-impeller drives and ignition interlock switches are operated by the levers such that the engine is "killed" in the event that the operator releases the traction drive control lever while the collector-impeller drive is engaged.

The patented design has the disadvantage of requiring the operator to place the collector-impeller drive control lever in an intermediate position between fully-released and engaged positions in order for the collector-impeller to remain engaged when the traction drive is disengaged and this requirement has proved to be awkward for operators to accomplish.

SUMMARY OF THE INVENTION

An object of the invention is to provide a deadman control system for self-propelled, walk-behind implements which is simple to use and reliable.

Another object of the invention is to provide first and second parallel-connected ignition interlock switches respectively actuatable by first and second deadman control levers and to mount a traction-drive control lever for concurrent actuation with one of the deadman control levers whereby the traction drive control lever and the one deadman control lever can both be released without causing interruption of the ignition circuit.

Yet another object is to provide a pair of identically constructed deadman control levers having switch elements mounted for movement therewith and engageable with the guide handle structure to complete the ignition circuit when the deadman control levers are gripped against the guide handle structure.

These and other objects will become apparent from a reading of the ensuing description together with the appended drawings.

BRIEF DESCRIPTION OF THE DRAWINGS

FIG. 3 is a schematic showing of the ignition interlock circuitry of the present invention.

DESCRIPTION OF THE PREFERRED EMBODIMENT

Figure 1:
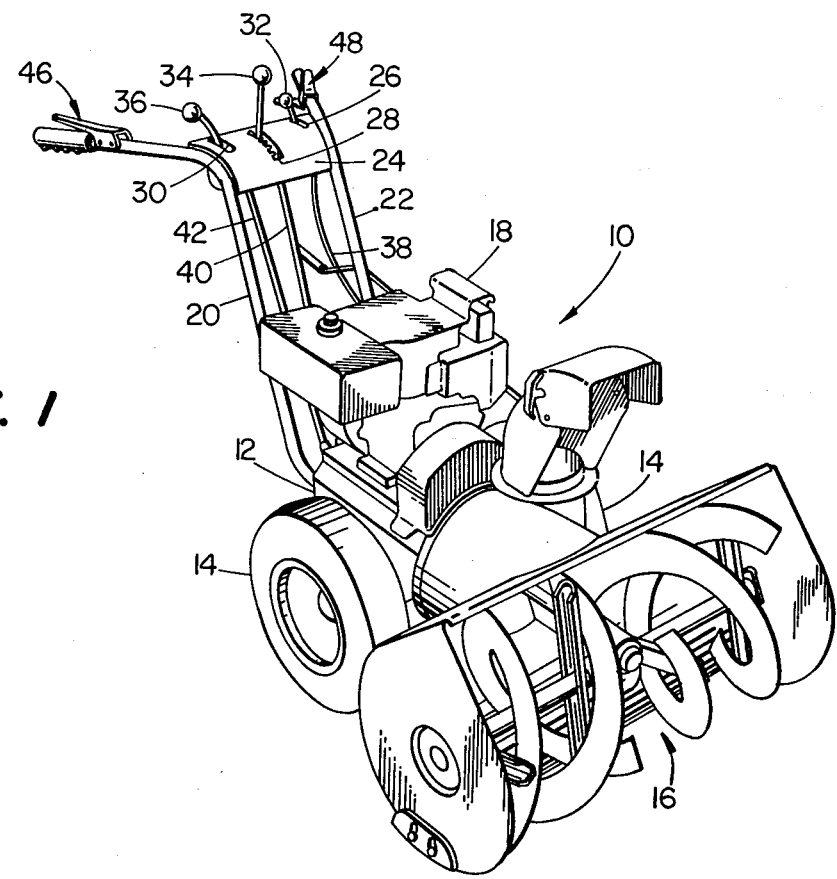
FIG. 1 is a right front perspective view of a snowblower embodying the present invention.

Referring now to FIG. 1, therein is shown a self-propelled, walk-behind snowblower indicated in its entirety by the reference numeral 10. The snowblower 10 includes a main frame or chassis 12 supported on a pair of traction or drive wheels 14. A collector-impeller 16 is mounted on the forward end of the frame 12. Supported on the frame 12 between the wheels 14 is an internal combustion engine 18 which is respectively coupled to the wheels 14 and to the collector-impeller by conventional, selectively engageable and disengageable traction and collector-impeller drives (not shown).

The snowblower 10 is controlled manually by a plurality of controls. Specifically, a guide handle structure, including right and left handle bars 20 and 22, is fixed to the rear end of the chassis 12 and extends upwardly and rearwardly therefrom. A control console 24 is connected between the handle bars 20 and 22 at a location forwardly of respective rear ends of the handle bars, the console having left, intermediate and right fore-and-aft extending guide slots 26, 28 and 30, respectively, located therein and respectively receiving fore-and-aft shiftable throttle control, speed-direction control and collector-impeller drive control levers 32, 34 and 36. The lever 32 is connected to a carburetor control arm (not shown) by a push-bull cable 38 while respective linkages including rods 40 and 42 are coupled between the levers 34 and 36 and respective speed-direction and collector-impeller drive control elements (not shown). As can best be seen in FIG. 3, a traction drive clutch control lever 44 is vertically pivotally connected to the left handle bar 22, as at a horizontal pivot pin 45, for movement between a downward, normally released, clutch-disengage position, as shown, to a raised, active, clutch-engage position wherein it is gripped against the handle bar.

The snowblower 10 as thus far described is conventional and applicant's invention as it is applied to the snowblower is set forth hereinbelow.

Figure 2:
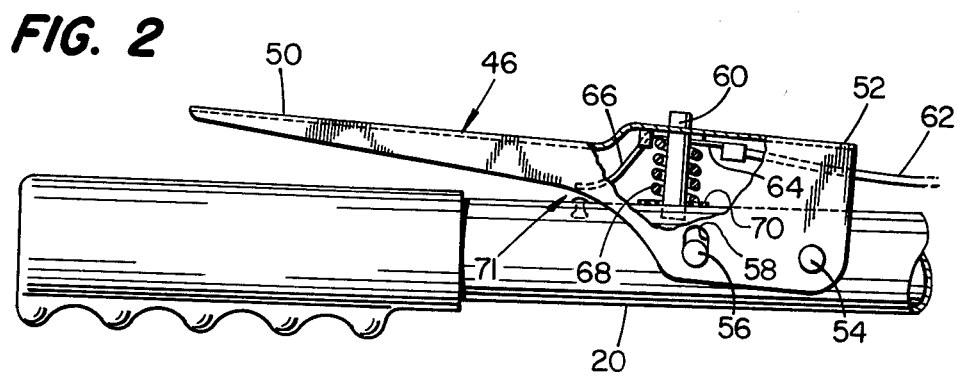
FIG. 2 is a right side elevational view, with portions broken away, showing the mounting of the deadman control lever and associated ignition interlock switch on the guide handle structure.

Respectively mounted on the handle bars 20 and 22 for vertical pivotal movement are identical deadman control levers 46 and 48. For the sake of brevity, only lever 46 is illustrated and described in detail with it to be understood that the described structure also applies to the lever 48. Thus, referring to FIG. 2, it can be seen that the lever 46 includes a forward channel-like end section 50 having the handle bar 20 received therein and includes a rearward handle section 52 integral with the section 50 and disposed above the handle bar. A horizontal pivot pin 54 pivotally connects the lever 46 to the handle bar and located in the handle bar rearwardly of the pin 54 is a stop pin 56 which is received in transversely aligned elongate slots 58 located in the opposite legs of the channel-like section 50. Fixed to the channel-like section 50 between the opposite legs thereof is an electrically non-conductive pin or stem 60 having its lower end reciprocally received in a hole provided in the top of the handle bar 20. An electrical lead 62 extends into the channel-like section 50 and terminates in a connector 64 received on the pin 60. Located on the pin 60 between the connector 64 and lever 46 is a switch element 66 formed of a metal strap which is bent to curve downwardly then rearwardly from its location on the pin 60. Provided for maintaining an electrically conductive path between the connector 64 and switch element 66 is a coil compression spring 68 received on the pin 60 below the element 66 and compressed between the channel-like section 50 and the handle bar 20, it being noted that the lower end of the spring rests on an electrically non-conductive washer 70 which insulates the spring from the handle bar. The spring 68 also acts to bias the lever 46 to and upwardly about the pivot pin 54 to a normally released position, as shown, wherein the handle section 52 is elevated above the handle bar and the switch element 66 is out of contact with the handle bar 20. During operation of the snowblower, an operator would normally grip the handle section 52 of the lever in a downward active position wherein the handle section and the switch element are in engagement with the handle bar 20. The handle bar 20 is electrically conductive and serves as a ground connection. Thus, the handle bar 20 cooperates with the switch element 66 to form a normally open switch 71, which is closed only when the lever 46 is placed in its active position. A similar normally open switch 72 is formed by the handle bar 22 and a switch element 73 mounted for movement with the lever 48.

As can best seen in FIG. 3, the collector-impeller drive control lever 36 is mounted on an electrically conductive support 74 which is grounded and supports an electrical contact 76 such as to be insulated therefrom and in the path of movement of the lever 36 so as to be engaged thereby only when the lever 36 is in its drive-disengage position. Thus the lever 36 and contact 76 cooperate to form a switch 78.

The switch 71, associated with the lever 46, the switch 72 associated with the lever 48 and the switch 78 associated with the lever 36 are connected in parallel with each other by means of a lead 80 forming part of an ignition interlock circuit 82 and connected to a safety circuit (not shown) located in a safety module 84. The module 84 is grounded, as at 86 and is adapted to be connected to a magnet associated with the engine 18. The circuitry in the module 84 may be of any construction capable of effecting interruption of engine ignition current any time any one of the interlock switches is open.

The operation of the invention is as follows: Assuming the engine 18 to be stopped, the operator would normally be standing beside the snowblower in order to crank the same and thus the levers 46 and 48 would be in their normally released positions and the respective interlock switches associated therewith would be open. Thus, the collector-impeller drive control lever 36 would have to be placed in its drive-disengage position before the engine 18 would start upon being cranked.

Once the engine 18 is running, the operator may engage the traction drive to move the snowblower to a desired work site by gripping the clutch control lever 44 upwardly to its clutch-engage position against the handle bar 22. The deadman control levers 46 and 48 would now also be gripped so as to be disposed in their respective active positions against the handle bars 20 and 22. Upon arriving at the work site, snowblowing may be commenced by the operator removing his right hand from the lever 46 and using it to actuate the lever 36 to its drive-engage position. In the event that the snowblower begins to plug, the operator can release his left hand from the traction drive control lever 44 and the deadman control lever 48 whereupon the lever 44 will swing downwardly to automatically disengage the traction drive. The right hand must now be kept on the right deadman control lever 46 in order to ensure that ignition current is maintained since the switches associated with the control levers 36 and 48 are now open.

I claim:

1. An operator presence-sensing safety lever and switch assembly, comprising: an electrically conductive support; a lever having a handle section joined to a channel-like end section; said end section receiving said support and being pivotally connected thereto; an electrically non-conductive guide stem located in the end section and respectively fixed to one and slidably received in another of the lever and support; an electrical lead having an end received on the guide stem; an electrical conductive switch element received on the guide stem; a coil compression spring received on the guide stem and acting to bias the switch element and lead into engagement with each other and to bias the handle section of the lever to an inactive position away from the support wherein the switch element is spaced from the support; electrical insulation located between the spring and support and the lever handle section and switch element being configured for movement to an active position against the support to thereby establish an electrical connection between the support and the lead.

2. In a combination of a deadman control lever and ignition interlock switch wherein the lever is pivotally mounted on a guide handle for movement between a released position away from the handle wherein it operates the switch to a circuit disrupting condition and an active position against the handle wherein it operates the switch to a circuit completing condition, the improvement comprising: an electrically non-conductive guide pin respectively reciprocally mounted in one and fixed to the other of the lever and handle; an electrical lead; a switch element mounted for movement with the lever and having a first end connected in current conducting relationship to the lead; said switch element having a free second end; biasing means including electrical insulation means preventing current flow through the biasing means mounted between the support and lever and urging the lever to its released position; said guide handle being electrically conductive; and said switch element being disposed to be engaged with the handle when the lever is moved to its active position.

3. The combination defined in claim 2 wherein the lever is provided with an elongate opening disposed parallel to and spaced from the pivotal connection of the lever to the handle; and a stop pin being received in the opening and in the handle for limiting the pivotal movement of the lever relative to the handle.

4. The combination defined in claim 2 wherein the lever includes a channel-like end having the handle received between opposite legs thereof and having the biasing means and switch element confined therein.

5. The combination defined in claim 2 wherein the pin is fixed to the lever and slidably received in the handle.

6. The combination defined in claim 2 wherein the biasing means is a coil compression spring received on the guide pin.

7. The combination defined in claim 6 wherein the lead has an uninsulated end received on the pin and the switch element is slidably mounted on the pin; and said coil compression spring acting to bias the switch element into contact with the lead.

* * * * *